United States Patent [19]
Nagaoka

[11] Patent Number: 4,578,248
[45] Date of Patent: Mar. 25, 1986

[54] DISTRIBUTOR/COLLECTOR ASSEMBLY

[75] Inventor: Tadayoshi Nagaoka, Mihara, Japan

[73] Assignee: Nagaoka Kanaami Kabushiki Kaisha, Japan

[21] Appl. No.: 438,933

[22] Filed: Nov. 3, 1982

[30] Foreign Application Priority Data

Nov. 6, 1981 [JP] Japan .................................. 56-117901

[51] Int. Cl.$^4$ ............................. B01J 8/04; B05B 1/14
[52] U.S. Cl. .................................. 422/310; 239/553.5; 422/194; 422/311
[58] Field of Search ............... 422/191, 192, 194, 140, 422/310, 311, 279; 134/25.1, 25.5, 198, 199, 200; 239/201, 207, 288.5, 450, 462, 499, 504, 557, 565, DIG. 23, 553.3, 553.5

[56] References Cited

U.S. PATENT DOCUMENTS

| | | | |
|---|---|---|---|
| 1,084,842 | 1/1914 | Bustin | 239/553.3 X |
| 1,962,663 | 6/1934 | McGill | 134/25.5 X |
| 2,399,827 | 5/1946 | Roach et al. | 422/191 |
| 2,431,803 | 12/1947 | Guyer et al. | 422/191 X |
| 3,208,833 | 9/1965 | Carson | 422/191 |
| 3,214,247 | 10/1965 | Broughton | 422/191 |
| 3,249,405 | 5/1966 | Waddill | 422/192 |
| 3,458,289 | 7/1969 | King et al. | 422/148 |
| 3,479,146 | 11/1969 | Hochman et al. | 239/553.5 X |
| 3,583,413 | 6/1971 | Mertzanis | 134/200 X |
| 3,592,613 | 7/1971 | Boyd | 422/191 |
| 3,598,541 | 8/1971 | Hennemuth et al. | 422/191 |
| 3,598,542 | 8/1971 | Carson et al. | 422/191 |
| 3,620,685 | 11/1971 | Rogers et al. | 422/192 |
| 3,705,016 | 12/1972 | Ludwigsen et al. | 422/191 |
| 3,758,279 | 9/1973 | Whitesides | 422/192 |
| 3,771,968 | 11/1973 | Stalnaker | 422/279 X |
| 3,907,210 | 9/1975 | Dow et al. | 239/553.3 |
| 4,182,741 | 1/1980 | Carson et al. | 422/791 X |
| 4,378,292 | 3/1983 | Haase | 422/191 X |

Primary Examiner—Barry S. Richman
Assistant Examiner—Brian P. Heaney
Attorney, Agent, or Firm—Diller, Ramik & Wight

[57] ABSTRACT

A fluid distributor/collector assembly is composed of a screen cylinder, a perforated tube provided in the screen cylinder and support discs also provided in the screen cylinder. The screen cylinder is made of cylindrically arranged support rods and a wire screen wound helically on the support rods. The perforated tube is formed with apertures for distributing or collecting fluid which flows through the wire screen. The support discs radially support the screen cylinder outwardly from the perforated tube thereby defining a space between the screen cylinder and the perforated tube. Within each support disc is an opening in which the perforated tube is supported. The assembly can be buried in a catalyst bed within a catalytic reactor and used to distribute or collect fluid.

8 Claims, 10 Drawing Figures

4,578,248

DISTRIBUTOR/COLLECTOR ASSEMBLY

BACKGROUND OF THE INVENTION

This invention relates to a distributor/collector assembly suitable for use as a distributor (or collector) in a column type of catalyst reactor, deodorizing apparatus or the like device.

The conventional column type catalyst reactor includes, as shown in FIG. 1, a number of catalyst support grids 2 provided in a reactor column 1. Catalyst layers 3 are disposed on these catalyst support grids 2 and distributors 4 are suspended in the space above the catalyst layers 3 to distribute fluid (liquid or gas) over the catalyst layers 3 (for convenience of explanation, description of the distributors 4 will be made hereinafter as distributing liquid). The liquid is dripped through numerous apertures formed in the distributors 4 over the catalyst layers 3 and is subjected to a desired reaction through the catalyst layers 3 and then the liquid after reaction is taken out of the reactor column 1 through an outlet 1a.

As will be understood from the above, the conventional catalyst reactor 1 is of such a construction that the distributors 4 are provided separately from the catalyst support grids 2. Such construction, however, requires a large number of the catalyst support grids 2, if there are many catalyst layers 3, which results in a high manufacturing cost. Besides, if the number of the catalyst layers 3 increases, space required for providing the distributors 4 increases as well resulting in requirement of a huge reactor column with a substantial portion of its inside space being not utilized for packing catalyst. Moreover, mounting of the prior art distributors 4 in the reactor column 1 requires precision of the highest degree for the liquid must be evenly distributed from the distributors 4 and the labor cost spent for the mounting of the distributors 4 amounts to a considerable sum.

SUMMARY OF THE INVENTION

It is, therefore, an object of the present invention to provide a distributor which has eliminated the above described disadvantages of the prior art distributor in the column type catalyst reactor. According to the invention, a novel buried type distributor having both a fluid distribution (or collection) function and a catalyst retention function is provided. By disposing this distributor in the catalyst layer in a buried state, the catalyst support grids which have been indispensable in the conventional reactor column are obviated, the labor cost for mounting the distributors in the reactor column is saved for the mounting position of the distributor according to the invention does not require such a high degree of precision as in the case of the prior art distributor, and moreover, the efficiency of space utilization in the reactor column is greatly improved for the catalyst does not have to be separated in plural layers even if the distributors are provided in plural stages.

In disposing a distributor in catalyst in a buried state, there arises the problem that while the buried distributor must have a sufficiently rugged construction to bear a heavy load imposed by the catalyst, the construction must not allow occurrence of a turbulent flow or drift of the liquid which is to be evenly distributed. There also arises the problem, particularly in the catalyst reactor wherein catalyst is circulated in a system including the reactor, that the distributor must be of a construction which will not allow clogging of the catalyst in openings from which the liquid is to be distributed.

The above described problems can be completely overcome by the distributor/collector assembly according to the invention which comprises a screen cylinder composed of a plurality of elongated support rods arranged cylindrically with a suitable distance between adjacent rods and a wire screen member wound helically on said cylindrically arranged support rods, a tube disposed in said screen cylinder and formed with a multiplicity of apertures for distributing or collecting fluid which flows through said wire screen member of said screen cylinder, and a plurality of support discs provided in said screen cylinder with a suitable distance therebetween in such a manner that said support rods of said screen cylinder are supported on the outer periphery of said support discs, each of said support discs being formed with an opening for being fitted with said tube and supporting said tube in said screen cylinder in such a manner that a space is defined between said tube and said wire screen member of said screen cylinder.

Preferred embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
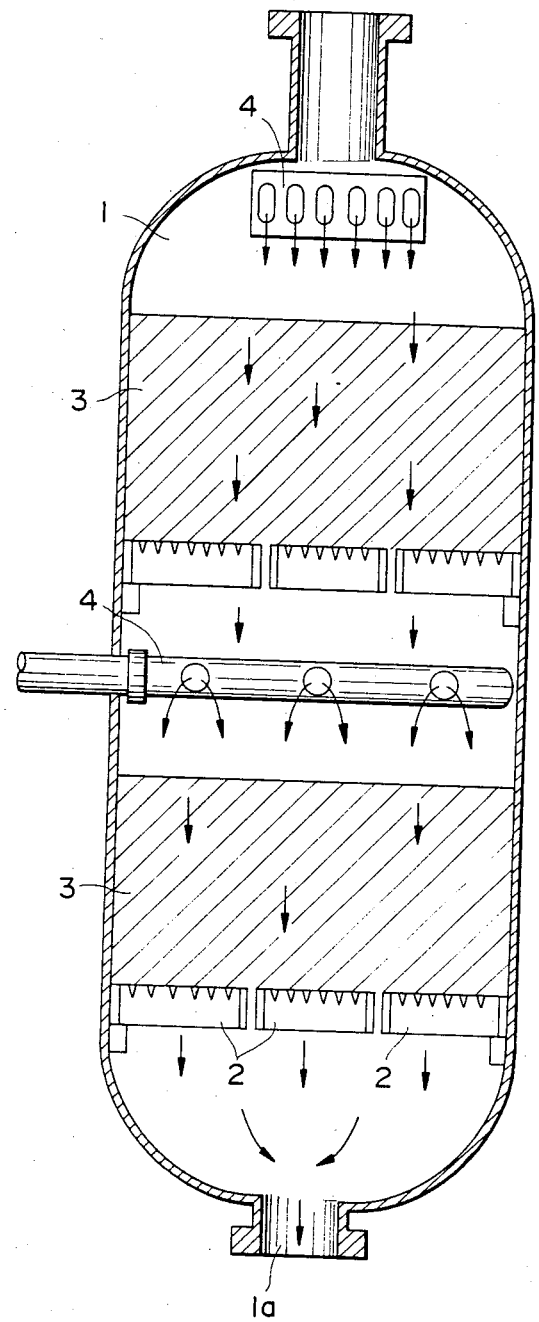
FIG. 1 is a vertical sectional view of a prior art column type catalyst reactor.
Figure 2:
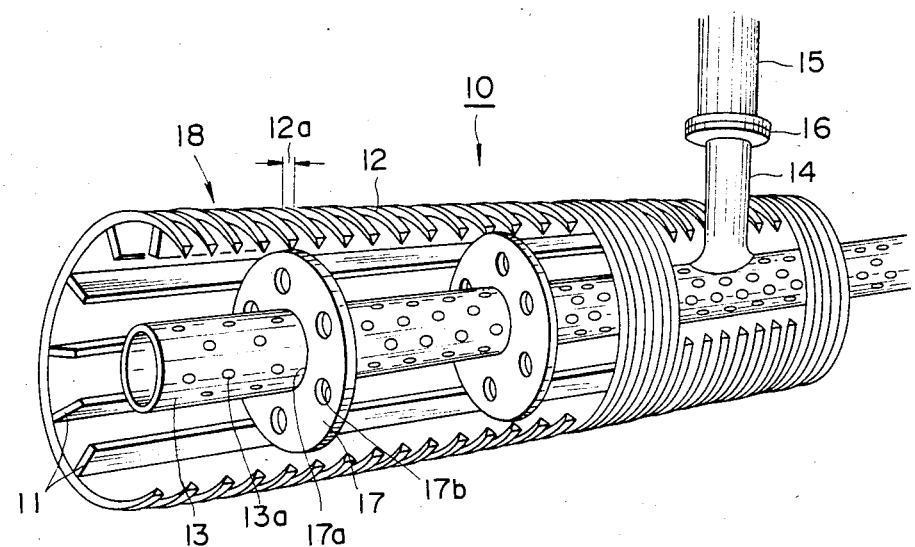
FIG. 2 is a perspective view showing an embodiment of the distributor/collector assembly according to the invention in a state in which a part of the screen cylinder is removed for the convenience of illustration.

FIG. 2 shows a basic embodiment of the distributor/collector assembly according to the invention generally designated by a reference numeral 10. A reference numeral 18 designates a screen cylinder composed of elongated support rods 11 and a wire screen member 12. The support rods 11 are arranged cylindrically with a suitable distance between adjacent rods. The wire screen member 12 is of a wedge shape cross section and is wound helically on the cylindrically arranged support rods 11 with a suitable pitch. Slits 12a are formed between respective adjacent wire portions. The width of each slit 12a is determined depending upon the size of a catalyst particle.

A plurality of support discs 17 are provided in the screen cylinder 18 with a suitable distance between adjacent support discs 17 in the axial direction of the screen cylinder 18. The support discs 17 are disposed in such a manner that the support rods 11 of the screen cylinder 18 are supported on the outer periphery of the respective support discs 17. Each of the support discs 17 is formed with a central opening 17a.

A tube 13 is fitted in the central openings 17a of the support discs 17. The support discs 17 therefore support the tube 13 in such a manner that a space (unnumbered) is defined between the tube 13 and the wire screen member 12 of the screen cylinder 18. The tube 13 is formed with a multiplicity of small apertures 13a for distributing or collecting fluid which flows through the slits 12a of the wire screen member 12. The support discs 17 in this example are further formed with openings 17b which are formed equidistantly in the disc portion about the central opening 17a for communicating the spaces between the tube 13 and the screen cylinder 18 that are separated from one another by the support discs 17.

It will be appreciated from the above description that the combination of the screen cylinder 18, the perforated tube 13 and the support discs 17 provides a unique structure in which the support discs 17 perform the dual functions of (1) supporting the screen cylinder 18 against load applied inwardly from outside thus serving as reinforcing elements for the screen cylinder 18 and (2) supporting the tube 13 in the center of the screen cylinder 18 without requiring any other supporting devices.

Reverting to FIG. 2, a branch tube 14 is connected to the tube 13 which in turn is connected through a coupling 16 to a pipe 15 of a system in which the cylindrical screen assembly is used. The ends of the screen cylinder 18 and the tube 17 are respectively closed by suitable closing members.

For making the distributor/collector assembly 10, the support discs 17 are first fitted with the perforated tube 13, the support rods 11 are welded with a suitable interval therebetween to the support discs 17 by, e.g., spot welding, and finally the wire screen member 12 is wound on the support rods 11 with a predetermined pitch and welded thereon by, e.g., spot welding. Alternatively, the wire screen member 12 may be pressed to the support rods 11 by utilizing elasticity of the wire screen member 12. In this case, the welding of the wire screen member 12 to the support rods 11 may be omitted.

Figure 3:
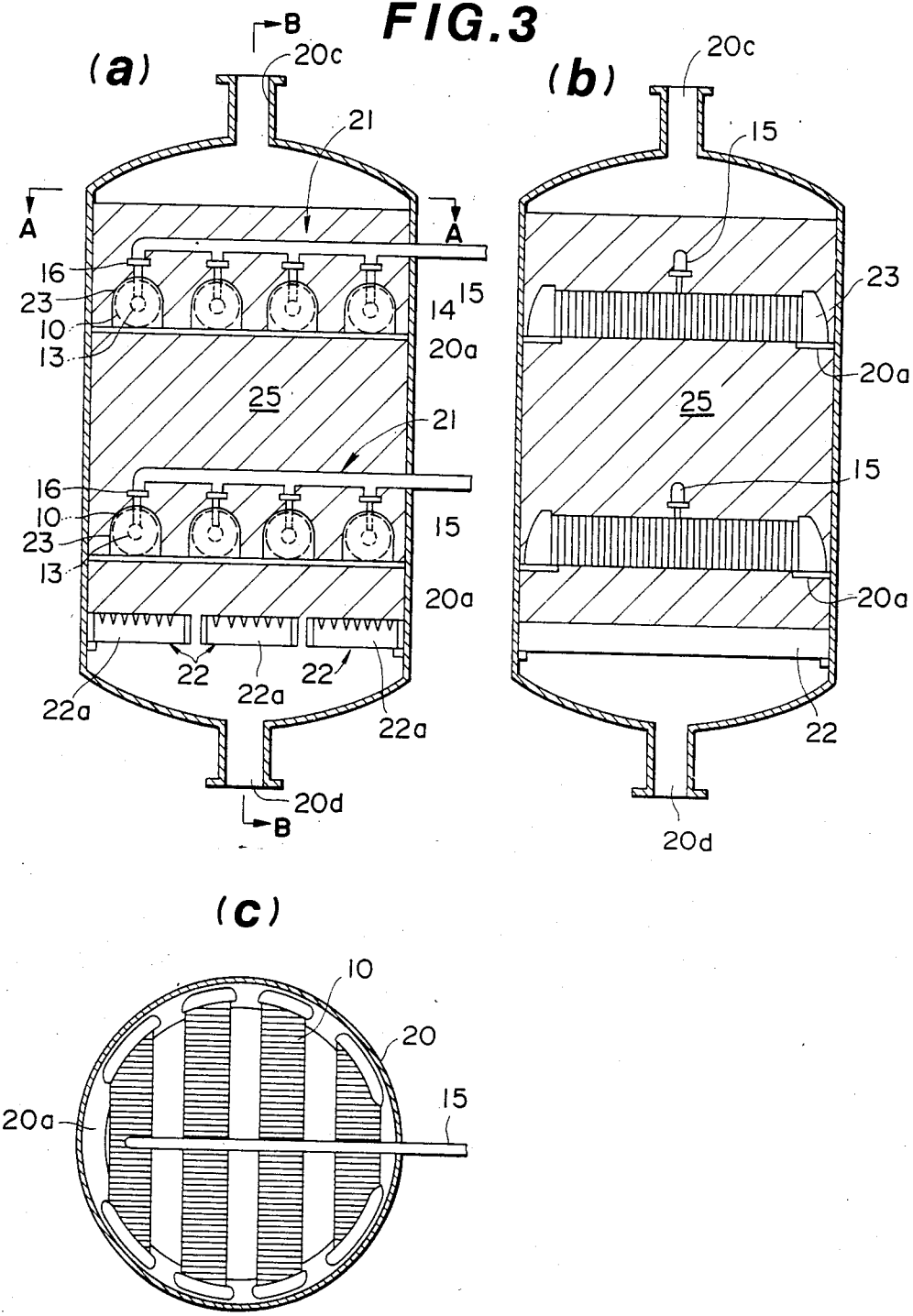
FIG. 3(a) is a front vertical section of an example of a column type catalyst reactor in which the distributor/collector assembly according to the invention is provided.
FIG. 3(b) is a cross sectional view of the catalyst reactor taken along lines A—A in FIG. 3(a)
FIG. 3(c) is a vertical sectional view of the catalyst reactor taken along lines B—B in FIG. 3(a)

An example of using the assembly 10 in the column type catalyst reactor is shown in FIGS. 3(a)–3(c). In this example, distributors 21 comprising a plurality of the distributor/collector assemblies 10 are disposed in upper and lower stages in a single layer of catalyst 25 packed in a column 20. Each of the distributors 21 includes the parallel assemblies 10 arranged in transverse to the pipe 15 and connected to the pipe 15 through the branch tubes 14 and the couplings 16. Each of the assemblies 10 is closed at both ends thereof by closing members 23 and mounted on a flange 20a secured to the inner wall of the column 20. A single layer of catalyst support grids 22 are provided in the lower portion of the column 20. The catalyst 25 is introduced into the column from an inlet 20c of the column 20 until the distributors 21 in the respective stages are completely buried in the catalyst.

Figure 4:
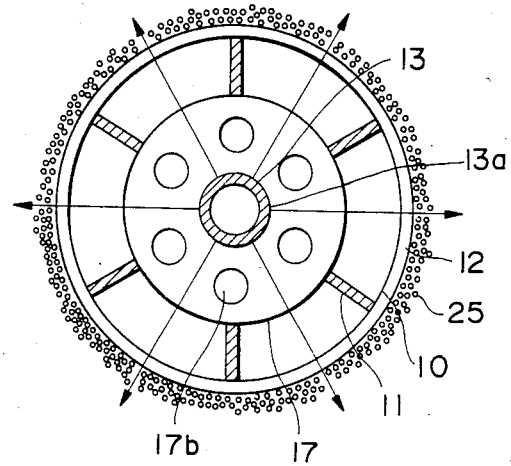
FIG. 4 is a view showing a state in which liquid is diffused from the distributor 21 shown in FIGS. 3(a)-3(c)

The liquid to be reacted is caused to flow through the pipes 15 into the perforated tube 13 of each assembly 10 and diffused into the catalyst 25 through the apertures 13a of the tube 13. This state is shown in FIG. 4. As will be seen from this figure, since there is space defined between the tube 13 and the wire screen member 12, the liquid is diffused more evenly over a wider range of the catalyst layer than in a case where the tube 13 is buried in the catalyst layer in direct contact with the catalyst. It is also an advantage of the assembly of the present invention that the slits 12a of the wire screen member 12 are uniformly provided and there is no substantial barrier that will obstruct the diffusion of the liquid through the slits 12a in all directions so that no turbulence or drift of the liquid takes place in the distribution.

The liquid that has diffused into the catalyst 25 flows downward within the catalyst layer and the expected reaction takes place during this downward flow of the liquid. The liquid, having completed the reaction, is received in the catalyst support grids 22 and taken out of the column 20 through openings 22a of the grids 22 and an outlet 20d of the column 20.

In the illustrated example, only one catalyst layer is provided and, since separation of the catalyst layer is unnecessary, the space inside of the column 20 can be utilized for filling of the catalyst 25 to a maximum extent so that a maximum space efficiency can be realized. Moreover, since only one layer of the catalyst support grids 22 suffices, the cost for the provision of the catalyst support grids 22 can be saved. In the illustrated example, two stages of the distributors 21 are provided. It will be apparent, however, that the above described advantages will become more prominent if there are an increased number of stages of the distributors 21.

The distributor/collector assembly according to the invention can be used only as a distributor but also as a collector. For example, the distributor 21 in the lower stage in the column shown in FIGS. 3(a)–3(c) may be used as the collector for collecting the liquid which has flowed down, after completion of the reaction, by providing for the fluid to flow into the tube 13 through the slits 12a. The liquid can then be taken out of the column 20 through the pipes 15. In this case, the catalyst support grids 22 are not required and the outlet 20d of the column is closed. It is also possible to use the distributor/collector assemblies 10 of the respective stages as the distributors for a certain period of time and, after completion of reaction, use the same assemblies as the collectors to collect the liquid.

The arrangement of the distributor/collector assemblies is not limited to the horizontal disposition as shown in FIGS. 3(a)–3(c) but the assemblies may be disposed vertically, or obliquely and crosswise or in a staggered arrangement.

Modified embodiments of the cylindrical screen assemblies according to the invention are shown in FIGS. 5, 6, 7 and 8. Throughout these embodiments, the same component parts as in the embodiment shown in FIG. 2 are designated by the same reference numerals and detailed description thereof will be omitted.

Figure 5:
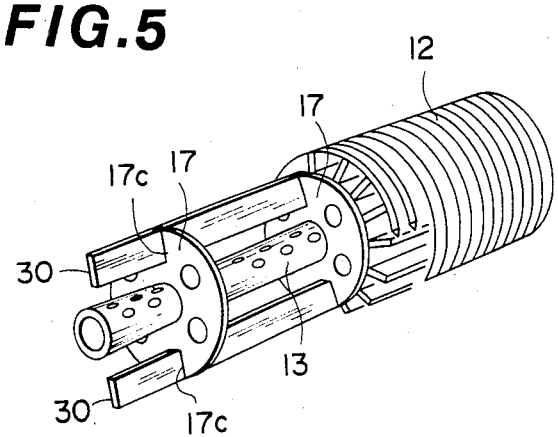

In the embodiment shown in FIG. 5, a pair of support beams 30 are fitted in slits 17c of the support discs 17 to connect these support discs 17 together and thereby to increase the strength of the distributor/collector assembly 10.

Figure 6:
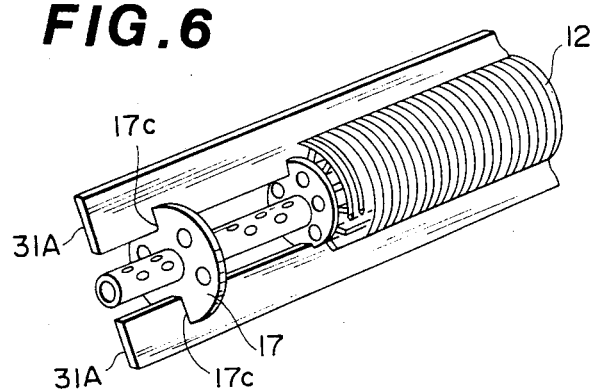

In the embodiment shown in FIG. 6, beams of a relatively large width are used as support beams 31A and 31B. A substantial portion of each of the beams 31A and 31B extends outside of the outer periphery of the support discs 17. The screen cylinder 18 is divided into two portions along a plane including its axis and the respective divided portions are welded to the support beams 31A and 31B on opposite sides thereof.

Figure 7:
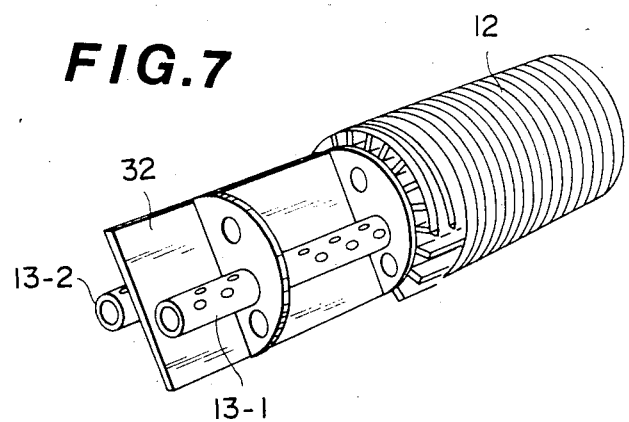

In the embodiment shown in FIG. 7, the space inside of the screen cylinder 18 is separated into two parts by a support beam 32 and two tubes 13-1 and 13-2 are provided in the respective parts.

Figure 8:
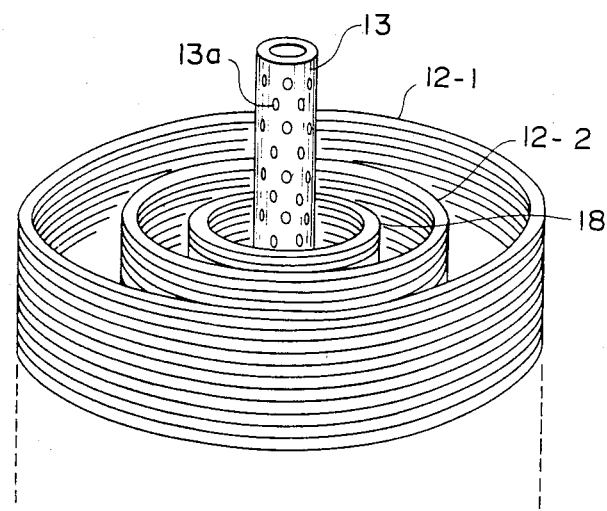
FIGS. 5, 6, 7 and 8 are perspective views showing, a part thereof being also removed, other embodiments of the distributor assembly according to the invention.

In the embodiment of FIG. 8, wire screens 12-1 and 12-2 are provided concentrically with the screen cylinder 18. Different kinds of catalysts are filled in the space between the inner wall surface of the column 20 (not shown in FIG. 8) and the outer wire screen 12-1, the space between the outer wire screen 12-1 and the inner wire screen 12-2 and the space between the inner screen 12-2 and the screen cylinder 18. The assembly is used as a vertical type distributor. The liquid ejected from the apertures 13a of the tube 13 is diffused through the screen cylinder 18, the inner wire screen 12-2 and the outer wire screen 12-1 and reactions are carried out while the liquid flows through the different catalyst layers.

The screen cylinder 18 in the above described embodiments are all of a circular cross section. The configuration of the screen cylinder 18 is not limited to this but may be of an elliptic, octagonal, hexagonal or the like cross section. The configuration of the support discs 17 can also be varied depending upon the configuration of the screen cylinder 18. The wire screen member 12 should preferably be of a wedge-shape cross section but wires of other cross section may be used if they are capable of effectively preventing clogging of the slits 12a by catalyst particles.

In the above described embodiments, the distributor/collector assembly 10 is utilized as the distributor or collector in the catalyst reactor. The distributor/collector assembly 10 can be utilized as a distributor or collector for various uses in other chemical processes such, for example, as a deodorizing apparatus.

I claim:

1. A fluid distributor/collector assembly comprising: a screen cylinder composed of a plurality of elongated support rods arranged cylindrically spaced apart with a suitable distance between adjacent rods and a wire screen member wound helically on said cylindrically arranged support rods;
at least one tube disposed within said screen cylinder and formed with a multiplicity of apertures for distributing or collecting fluid which flows through said wire screen member of said screen cylinder;
a plurality of support discs, each having an outer periphery, provided within said screen cylinder said support discs being positioned spaced apart along the axis of said screen cylinder in such a manner that said support rods of said screen cylinder are supported on the outer periphery of said support discs, each of said support discs having at least one tube opening in which said at least one tube is positioned thereby supporting said at least one tube within said screen cylinder in such a manner that a space is defined between said tube and said wire screen member of said screen cylinder;
each adjacent pair of support discs setting-off therebetween a portion of said at least one tube and defining space sections within said space between said at least one tube and said screen cylinder;
all of said tube portions having flow apertures therein;
flow communication means in each of said support discs for permitting fluid to flow between adjacent space sections; and pipe means connected to said at least one tube for supplying fluid to be distributed to said at least one tube or for removing fluid that has collected within said at least one tube.

2. A fluid distributor/collector assembly as defined in claim 1 wherein said support discs are formed with a pair of slits in diametrically opposed positions in said support discs and which further comprises a pair of support beams which are fitted into said slits of said support discs to connect said support discs together.

3. A fluid distributor/collector assembly as defined in claim 1 wherein each of said support discs are formed with a plurality of said tube openings and a plurality of said tubes, and wherein each tube opening has only one tube supported therein.

4. The fluid distributor/collector assembly as defined in claim 1 wherein said flow communication means comprises at least one opening through each support disc.

5. A fluid distributor/collector assembly comprising: at least one elongated tube; a plurality of aperture means along said at least one elongated tube for distributing or collecting fluid therethrough; means defining a screen of a generally cylindrical configuration, said screen means being in external substantially radially spaced relationship to said at least one elongated tube thereby defining an annular longitudinally extending chamber between said screen means and said at least one elongated tube through which a fluid may flow; a plurality of support means spaced a predetermined distance from each other axially along said at least one elongated tube and between said at least one elongated tube and said screen means for supporting said screen means in said radially spaced relationship, said support means being a plurality of support discs with adjacent support discs setting-off therebetween a portion of said at least one elongated tube and dividing said chamber into sections, all of said tube portions having flow apertures therein; flow communication means in each of said support discs for permitting fluid to flow between adjacent chamber sections; and pipe means connected to said at least one elongated tube for supplying a fluid to be distributed to said at least one elongated tube or for removing fluid that has collected within said at least one elongated tube.

6. The fluid distributor/collector assembly as defined in claim 5 wherein said flow communication means comprises at lease one opening through each support disc.

7. The fluid distributor/collector assembly as defined in claim 5 wherein each of said support discs has at least one tube opening and an outer periphery, said at least one elongated tube being supported within said at least one tube opening, and each support disc being secured at its outer periphery to said screen means.

8. The fluid distributor/collector assembly as defined in claim 7 wherein each of said support discs has a plurality of said tube openings and plurality of said elongated tubes, and wherein each tube opening has only one elongated tube supported therein.

* * * * *